Feb. 11, 1941. R. A. LAMSON 2,231,078
SIRUP THROW GAUGE BOTTLE
Filed Aug. 23, 1939
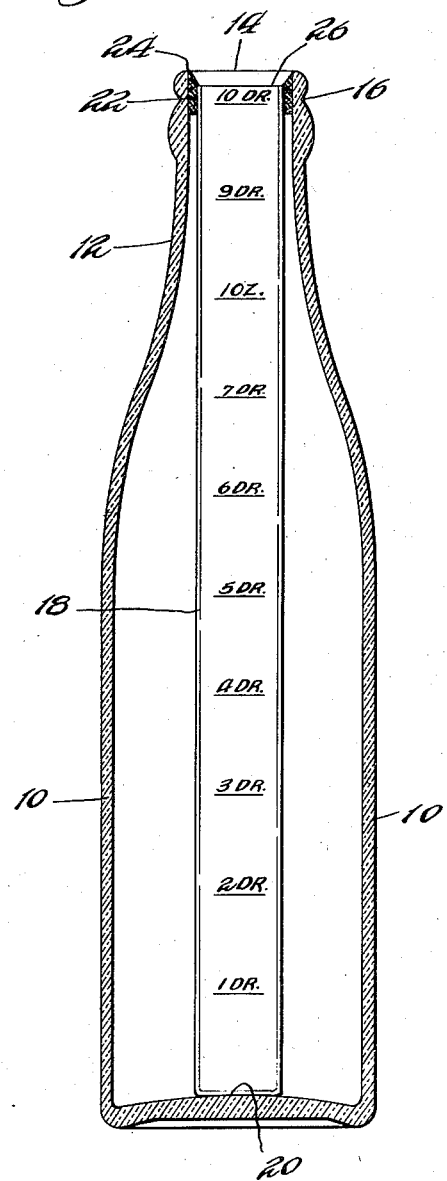
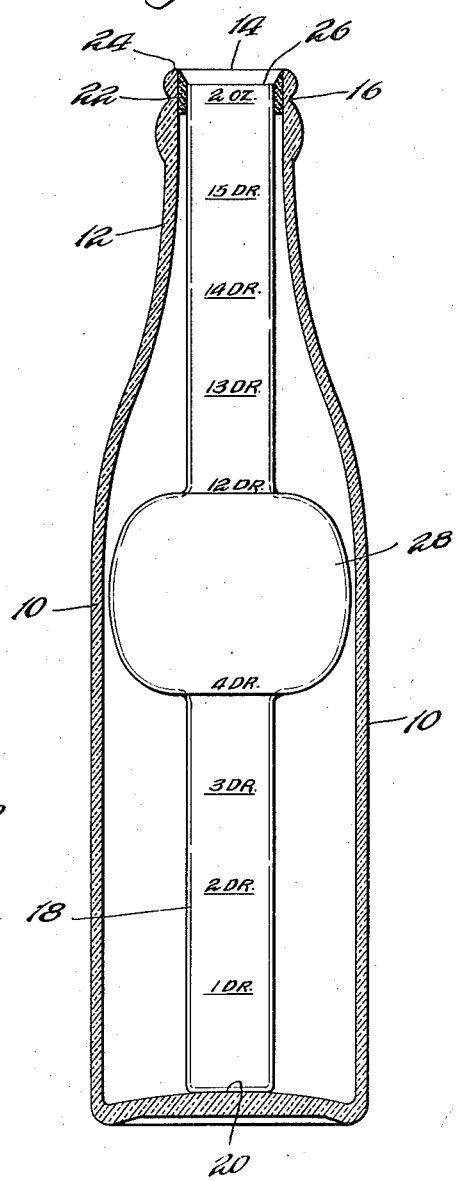
INVENTOR.
Robert A. Lamson
BY John B. Hosty
ATTORNEY.

Patented Feb. 11, 1941

2,231,078

UNITED STATES PATENT OFFICE 2,231,078

SIRUP THROW GAUGE BOTTLE

Robert A. Lamson, Oak Park, Ill.

Application August 23, 1939, Serial No. 291,553

3 Claims. (Cl. 73—166)

The object of my invention is the provision of a simple, efficient, inexpensive sirup throw gauge bottle, for accurately measuring the throw of sirup or other basic ingredients in automatic bottling machines and the like, under actual working conditions while the machine is in operation. In machines of this character, a predetermined amount of sirup, or other basic ingredient, is automatically fed to successive bottles. However, owing to possible changes in the viscosity of the sirup, or for other reasons, it sometimes happens that the machine may not be functioning true to the predetermined volume.

As soft drinks, and the like, are generally processed according to formula—which is jealously guarded—and as the exact amount of basic sirup to be deposited in a bottle of predetermined size is considered an important element in the execution of the formula, a simple and efficient method of checking the exact throw of the machine while the same is in active operation is highly desirable. Also, from the standpoint of economy of production it is desirable that the throw of the machine be accurate at all times, for the basic sirup is generally the most expensive element entering into the composition of the finished beverage. A slightly excessive amount of sirup, could over a period of time, add appreciably to the cost of production, and yet the excessive amount might be so slight as not to be easily detectable in the ordinary beverage bottle.

As it is important that the machine deliver the proper amounts of sirup, or other basic ingredients, tests for quantity are made from time to time, particularly at the start of a run. I am aware that in some cases the operator removes a bottle at random from the line coming from the machine, and pours the contents into a graduated glass. This method is not very satisfactory because an accurate measurement is frequently impossible due to the somewhat sticky character of the sirup, and the human element involved. If the throw is taken directly from the machine into the graduated glass, it is apt to be inaccurate, being the result of conditions unlike those of normal bottle-controlled delivery. If a graduated measuring cup having substantially the same diameter as the particular run of bottles for which tests are to be made be placed within an outer shell of the size and shaft of the containers to be filled, the shell wall having a cut-out to render the measuring cup visible, it is still difficult, if not impossible, to detect slight variations in the desired quantity. As the diameter of the measuring cup is substantially the same as the diameter of the bottles to be filled, a portion of a dram, for example, would make such a slight variation in the altitude of the sirup, that an exact reading would be practically impossible.

It is an object of the present invention to provide a measuring device capable of accurately testing the throw of sirup or other basic ingredients being delivered to containers under conditions identical with normal delivery so that the operator can hold the same before his eyes and quickly measure the accuracy of the throw received by the throw gauge bottle.

I have selected certain embodiments of my invention for the purpose of illustration, and for affording an understanding of the invention, but it is to be understood that the embodiments illustrated are for the purpose referred to above only, and not for limitation of the invention.

In the drawing:

Fig. 1 is a central longitudinal cross-sectional view of a standard bottle housing a graduated tube, the latter element being shown in elevation, and Fig. 2 is a similar view of a modified form of construction wherein the tube is provided with a well or pocket to increase the capacity of the tube.

Referring more in detail to the drawing:

The reference character 10 indicates a conventional bottle, having a neck 12 and a mouth 14. The inside roll or cap-ring 16 is ground out, if necessary, to receive the graduated tube 18, the tube having been previously calibrated to assure the accuracy of the graduations. The tube 18, open at the top, and closed at its base 20, has the underside of the latter cemented or otherwise securely affixed to the bottom center of bottle 10. The top portion of the tube 18, adjacent the throat of bottle 12, is cemented or otherwise securely affixed to the top of the bottle to hold it firmly in place, as indicated by reference numeral 22. Tube 18 is not flush with the external extremity of lip 24 of bottle 10, but is slightly sunk as indicated by reference character 26.

The graduate marks on tube 18, clearly depicted in the drawing, are placed on the tube in contrasting color to that of the sirup, or other basic ingredient for which the test is contemplated. For example, in the case of a dark brown sirup, the graduate line may be white, whereas in the case of an orange sirup, the capacity, or graduate marks may be black, it being obvious that the purpose of the contrasting graduate marks is to facilitate the reading of the tube.

It will be observed that tube 18 has a very small diameter compared to the diameter of the bottle in which it is housed and firmly held in place. Reference to Figure 1 of the drawing shows that an ounce of sirup deposited in the tube will acquire a considerable altitude reaching to the neck of the bottle, and because of the comparative narrowness of the tube, the graduate markings may be comparatively far apart, making it an easy matter to read the quantity of the throw in drams and fractions thereof, and immediately determine whether the throw is correct, over, or under.

Fig. 2 is a modified form of construction in which tube 18 is provided with a pocket or enlargement 28 to provide greater measuring caacity, but is otherwise securely affixed to the bottle as in Figure 1.

While in the modified form of construction I have illustrated a pocket or well to increase the capacity of the tube, it is obvious that the pocket or well might be adjacent the base of the tube, or located on different portions of the tube, or that the tube might be tapered in various ways to achieve the increased capacity.

The tube can be inserted in the bottle in various ways well known to the art. For example, it may be inserted through the mouth of the bottle if it can be conveniently ground out to receive it, or it can be inserted through a hole or aperture in the bottom of the bottle, or the side walls of the bottle may be sectioned or melted electrically.

When it is desired to test the throw of the machine, the sirup throw gauge bottle, above described is substituted in lieu of a bottle in the line being fed to the machine. It is thus presented to the machine like any other bottle, and after receiving a throw is removed from the conveyor line so that the operator may quickly and accurately determine the exact throw of the machine and make such adjustments as may be indicated.

With the device described, not only is a true test obtainable, but it is obtainable immediately without interfering with the operation of the machine, and uniformity of quality in the finished beverage is thus made possible. It is, of course understood, that in processing the beverage from the sirup or other basic ingredient, a diluent, such as carbonated or plain water or other fluid is added to the sirup to produce the finished beverage.

Having fully described my invention, and its method of operation, what I desire to secure by Letters Patent is shown in the appended claims:

1. A device of the character described for quantitatively testing the throw of sirup from an automatic bottling machine, comprising a transparent bottle having a graduated transparent tube with a cross-sectional area substantially less than the body portion of said bottle, but only slightly less than the neck portion of the bottle, said tube being closed at its lower end, and extending from the inner bottom wall of said bottle to a plane closely adjacent the top of said bottle, the said tube having the same diameter throughout its length, the closed end of the tube being securedly affixed to the inner bottom wall of said bottle, and the upper open end securedly affixed to the inner surface of the bottle adjacent the top thereof, with the mouth of the tube falling a little short of being flush with the plane of the mouth of the bottle, the means for securedly affixing the upper portion of the tube and bottle rendering the space between the inner upper portion of the bottle and the outer upper portion of the tube impervious to the passage of sirup or liquids so that any ingredients introduced into the bottle are received in the tube.

2. A device of the character described for quantitatively testing the throw of sirup from an automatic bottling machine, comprising a transparent bottle having a graduated transparent tube with a transverse diameter substantially less than the transverse diameter of the body portion of said bottle, but only slightly less than the neck portion of the bottle, said tube being closed at its lower end, and extending from the inner bottom wall of said bottle to a plane closely adjacent the top of said bottle, the closed end of the tube being securedly affixed to the inner bottom wall of said bottle, and the upper open end of said tube being securedly affixed to the inner surface of the bottle adjacent the top thereof by sealing means rendering the space between the inner upper portion of the bottle and the outer upper portion of the tube impervious to the passage of sirups or liquids, the mouth of the tube falling a little short of being flush with the plane of the mouth of the bottle.

3. A sirup throw gauge bottle, comprising a transparent bottle housing a graduated transparent tube having a transverse diameter substantially less than the transverse diameter of the body portion of said bottle, but only slightly less than the diameter of the neck portion of the bottle, the said tube having a volume-increasing protuberance along a portion of its length, the said tube being closed at its lower end and open at its upper end, and extending from the inner bottom wall of said bottle to a plane closely adjacent the mouth of said bottle, the closed end of the tube being securedly affixed to the inner bottom wall of said bottle, and the upper open end being securedly affixed to the inner surface of the bottle adjacent the top thereof by sealing means rendering the space between the inner upper portion of the bottle and the outer upper portion of the tube impervious to the passage of sirups or liquids, the mouth of the tube falling a little short of being flush with the mouth of the bottle so that any ingredient introduced into the mouth of the bottle is received in the tube.

ROBERT A. LAMSON.